(12) United States Patent
Müller et al.

(10) Patent No.: US 7,244,171 B2
(45) Date of Patent: Jul. 17, 2007

(54) DEVICE AND METHOD FOR PRODUCING SAUSAGES

(75) Inventors: Gerhard Müller, Schemmerhofen (DE); Siegfried Reutter, Eberhardzell (DE); Manfred Bachtle, Schemmerhofen (DE)

(73) Assignee: Albert Handtmann Maschinenfabrik GmbH & Co. KG, Biberach/Riss (DE)

( * ) Notice: Subject to any disclaimer, the term of this patent is extended or adjusted under 35 U.S.C. 154(b) by 154 days.

(21) Appl. No.: 11/055,333

(22) Filed: Feb. 10, 2005

(65) Prior Publication Data

US 2005/0183584 A1    Aug. 25, 2005

(30) Foreign Application Priority Data

Feb. 10, 2004    (EP)    ................... 04002931

(51) Int. Cl.
*A22C 11/00*    (2006.01)
(52) U.S. Cl. ....................................... 452/33
(58) Field of Classification Search ........... 452/30–37, 452/40–43, 46–48, 51
See application file for complete search history.

(56) References Cited

U.S. PATENT DOCUMENTS

| 2,234,054 | A | * | 3/1941 | Mason ..................... 138/118.1 |
| 2,330,496 | A | * | 9/1943 | Kidd .......................... 452/43 |
| 2,805,444 | A | * | 9/1957 | Hensgen et al. .............. 452/43 |
| 2,999,270 | A | * | 9/1961 | Knapp .......................... 452/31 |
| 3,659,317 | A | * | 5/1972 | Kupcikevicius .............. 452/35 |
| 3,670,362 | A | * | 6/1972 | Hughes ....................... 452/43 |
| 3,751,202 | A | | 8/1973 | Coleman et al. |
| 3,752,618 | A | | 8/1973 | Moreland |
| 3,889,013 | A | * | 6/1975 | Moule ........................ 426/513 |
| 4,257,146 | A | * | 3/1981 | Karp ........................... 452/31 |
| 4,340,994 | A | * | 7/1982 | dos Santos et al. ......... 426/388 |
| 4,915,968 | A | * | 4/1990 | Matthews et al. .......... 426/513 |
| 5,069,608 | A | * | 12/1991 | Rather ........................ 418/261 |
| 5,888,131 | A | | 3/1999 | Kobussen et al. |
| 6,056,634 | A | * | 5/2000 | Schwarz et al. .............. 452/27 |
| 6,056,635 | A | * | 5/2000 | Vermeer et al. .............. 452/46 |
| 6,245,369 | B1 | * | 6/2001 | Kobussen et al. .......... 426/231 |

FOREIGN PATENT DOCUMENTS

| DE | 1015341 B | 9/1957 |
| EP | 1371293 | 12/2003 |
| JP | 60-034166 | 2/1985 |
| JP | 2004-033218 | 2/2004 |
| WO | WO 02/060264 | 8/2002 |

\* cited by examiner

*Primary Examiner*—Thomas Price
(74) *Attorney, Agent, or Firm*—Marshall, Gerstein & Borun LLP

(57) ABSTRACT

A device for producing sausages having at least two coextrusion heads for co-extruding strands of sausage meat which are encased with a casing material, a joint supply is provided for the sausage meat and/or a joint supply is provided for the casing material, each being connected via individual supply elements to the coextrusion heads. The device permits producing exact products where at least the supply means for the casing material and/or the associated supply elements regulating/controlling the volume and/or the pressure of the casting material flow.

7 Claims, 3 Drawing Sheets

DEVICE AND METHOD FOR PRODUCING SAUSAGES

FIELD OF THE DISCLOSURE

The present invention relates to a device for producing sausages with at least two coextrusion heads for co-extruding strands of sausage meat which are encased with a casing material, wherein a joint supply means is provided for the sausage meat and/or a joint supply means for the casing material, each being connected via individual supply elements to the coextrusion heads.

The present invention further relates to a method for producing sausages, wherein strands of sausage meat which are encased with a casing material are co-extruded by at least two coextrusion heads, wherein the sausage meat and/or the casing material is/are conveyed by a joint supply means to the coextrusion heads and the respective mass flow is divided into partial flows which are guided to the coextrusion heads.

BACKGROUND OF THE DISCLOSURE

A device and a method of this type are known from WO 02/060264 A1.

Furthermore, extrusion systems are known with which several skinless strands of sausage meat are produced and processed at the same time. These extrusion systems comprise a plurality of extrusion nozzles that are horizontally arranged side by side, and they are capable of producing up to ten strands running in parallel with one another from the machine. A reservoir is here provided, from which sausage meat is pumped through a feed line into a distributor which supplies the sausage meat to the individual nozzles. The distributor is configured as a pressure chamber which is followed by a pump block which conveys the sausage meat contained in the pressure chamber to the nozzles. Air inclusions are avoided by conveying the sausage meat into the pressure chamber, and homogenization is achieved. Moreover, a compensating buffer effect is achieved between the supply and the pump delivery.

Such systems, however, are only configured for extruding skinless strands. The coextrusion of sausages which are surrounded with a skin poses special problems that do not arise during extrusion, especially as regards the mounting of the sausage casing.

An example of a coextrusion system in which a collagen casing is injected around a pasty inner mass, especially consisting of sausage meat, is known from EP 1 371 293. This coextrusion system is equipped with a single coextrusion head. The material for producing the casing is supplied by means of a pump to the coextrusion head and is injected, by means of an annular gap which coaxially surrounds the inner mass in the coextrusion head, onto said mass, whereby an outer skin is produced.

Although the percentage of the outer skin in the whole sausage is only small, variations in the delivered amount of the casing material have a strongly disadvantageous effect because a supply amount varying from product to product must not be fallen below for producing a stable, i.e. sufficiently thick, sausage casing. On the other hand, however, the amount of the supplied casing material should not be too great. Although a great amount improves the stability of the sausage casing, the further treatment of the products is impaired because the drying time is in particular extended. Furthermore, a sausage casing that is too thick has a disadvantageous effect on the later consumption of the product because in such a case the sausage is not "crispy".

The stability of the sausage casing on the one hand and the fast further treatment of the product and the consumption friendliness on the other hand can only be ensured if very narrow quantitative tolerances are observed during supply of the casing material.

The quantitatively exact supply of casing material is further rendered difficult if several parallel-operating coextrusion heads are used for simultaneously producing several sausage strands.

Such a coextrusion system with several heads is known from the above-mentioned WO 02/060264 A1. This system comprises six coextrusion heads that are arranged in parallel and are connected to a distributor strip for the supply of sausage meat and to a distributor strip for the supply of casing material. Each of the distributor strips are coupled via individual lines to the various coextrusion heads and are fed via two feed lines with sausage meat and casing material, respectively. The sausage meat and the casing material are divided in the respective feed line and are then supplied via the individual lines to the parallel-arranged coextrusion heads. This entails great pressure differences in the individual lines, which has an extremely negative effect on the supply of the casing material because it is thus not possible to produce uniformly thick outer skins of a reproducible quality. Moreover, the skin thickness cannot be adapted to different products.

That is why efforts were taken to produce products of uniform preciseness with a sufficiently constant skin thickness on coextrusion systems comprising several coextrusion heads.

To this end the joint supply of the filling material and of the casing material, respectively, was above all abandoned and replaced by individually supplied coextrusion heads so that each coextrusion head has assigned to it at least one pump of its own for the supply of mass material. Although this achieves a certain influence on the supply amount via the delivery rate of the respective pump, the power consumption of the coextrusion system is considerably increased by the use of several pumps. Moreover, this concept does not permit a fast and flexible adaptation to short-term quantitative variations because such a system normally reacts with too much inertia.

The above-cited WO 02/060264 A1 further discloses that the output rate of the individual coextrusion heads should be adjusted. This is important insofar as in the further processing process the individual sausage strands are combined to form bunches, which is facilitated by a homogeneous output rate. The problem regarding the production of stable sausage casings that are not too thick at the same time is not touched thereby.

SUMMARY OF THE DISCLOSURE

It is therefore the object of the present disclosure to indicate a device and a method for producing sausages, wherein a plurality of sausage strands are simultaneously produced by coextrusion and the sausages have a stable skin that is not too thick.

The advantage of the disclosure is that an exact dosage of the casing material becomes possible through the regulation and control of the volume and/or pressure of the casing material flow, whereby the thickness of the outer skin can be adjusted in an exact way. Thus it is now possible to compensate unintended quantitative variations and also to adapt the skin thickness to different products in consideration of special customer wishes even in the case of a joint casing material supply for several coextrusion heads.

Moreover, the disclosure entails cost advantages because it is only necessary to supply exactly so much casing material as is actually needed for a sufficiently stable casing. Hence, the amount of consumed casing material is relatively small. Moreover, with a low power consumption it is possible to produce exact products of a constantly high quality.

Expediently, the means for regulating/controlling the volume and/or the pressure are arranged in the supply means for the casing material such that the casing material flow to the individual supply elements is divided by the means for regulating/controlling the volume and/or the pressure. With this preferred configuration of the disclosure, variations in the supply amount are suppressed particularly efficiently because the regulation/control of the volume and/or of the pressure is already carried out during generation of the partial flows, so that the division of the total flow into the individual partial flows does not create any pressure losses, or these are compensated right away.

Preferably, the means for regulating/controlling the volume and or pressure are also provided in the supply means for the sausage meat and are arranged such that the flow of sausage meat to the individual supply elements is divided by the means for regulating/controlling the volume and/or the pressure. This configuration of the disclosure permits not only the regulation and dosage of the casing material amount supplied, but also the regulation or dosage of the amount of sausage meat with which the individual coextrusion heads are supplied. Moreover, this configuration has the advantage that quantitative variations are suppressed in a particularly efficient way because the amount of sausage meat is regulated together with the division of the total flow of sausage meat into the partial flows of sausage meat.

The means for regulating/controlling the volume and/or the pressure may comprise flow dividers. These flow dividers, in turn, may comprise gear pumps and/or vane-type pumps. These dosage means are particularly well suited for regulating/controlling the volume and/or the pressure of the respective product flow, i.e. both the filling material and the casing material.

Preferably, several gear pumps or vane-type pumps are combined to form a pump block. The flow dividers may be designed in different ways, particularly by different delivery amounts per revolution due to different volumes of the individual pump blocks and/or by separate drives for each pump block and/or by different gear stages per pump block. Different calibers can thus be produced in parallel with one another, e.g. calibers 15, 17, 19, 21, etc.

BRIEF DESCRIPTION OF THE DRAWINGS

The invention shall now be explained in more detail with reference to embodiments taken in conjunction with the attached schematic drawings, in which.

DETAILED DESCRIPTION OF THE DISCLOSURE

Figure 1:
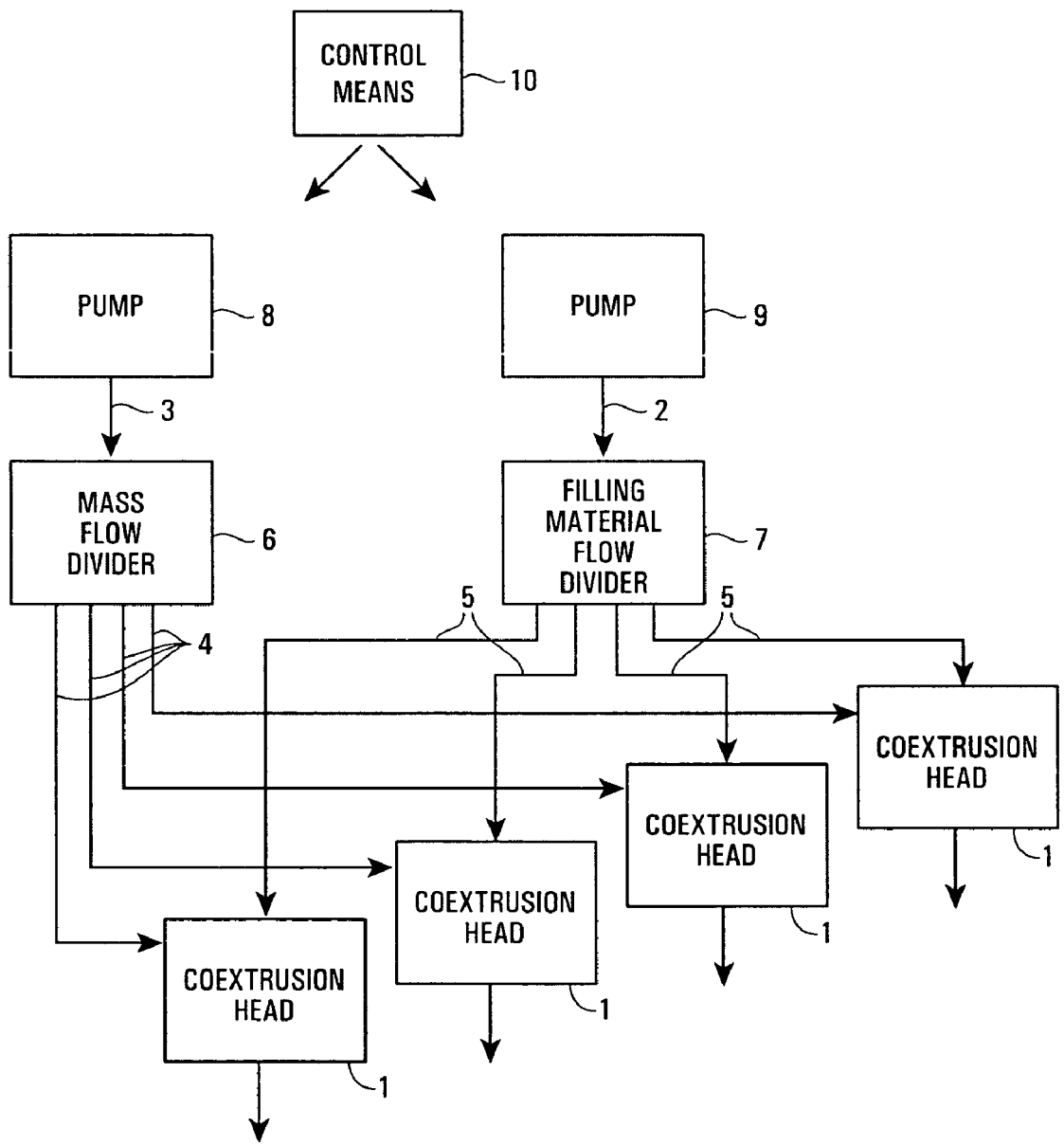
FIG. 1 is a flow diagram showing a construction with flow divider, both for the filling material and the casing material.

FIG. 1 schematically shows the basic construction of a coextrusion system according to an embodiment of the disclosure in the form of a flow diagram. The coextrusion system has a reservoir (not shown) which contains the casing material. Said reservoir has assigned thereto a first pump 8 which conveys the casing material from the reservoir into a joint supply means 3. Said joint supply means 3 may comprise a feed line which is connected to a distributor. As can further be seen in FIG. 1, the joint supply means 3 for the casing material and the individual supply elements 4 which lead to the respective coextrusion heads 1 have provided thereinbetween a mass flow divider as a means 6 for regulating/controlling the volume and/or the pressure. The mass flow divider may comprise several gear pumps and/or vane-type pumps.

The mass flow divider is connected to the distributor such that the casing material flow arriving from the joint supply means 3 is divided by the mass flow divider into the partial flows which are further conveyed into the individual supply elements. To this end each of the pumps may be arranged in the area of the entry openings of the individual supply elements 4, i.e. the individual lines leading to the respective coextrusion heads 1. The individual pumps may be driven by a motor or, alternatively, by the mass flow.

Hence, the pumps are connected between the joint feed line and the individual lines leading to the coextrusion heads 1, thereby permitting the regulation or control of the volume and/or of the pressure of the casing material flow.

The individual pumps may be combined to form a pump block which comprises a synchronous drive. The adjustment of different delivery rates for producing different products on the individual coextrusion heads 1 is carried out by way of different volumes of the individual pump blocks or by providing individual drives for each pump block. Furthermore, the individual pump blocks may be equipped with corresponding gear stages for transporting different delivery amounts.

Moreover, it is possible to modify the individual pumps in the above-mentioned way or to equip each with its own drive to achieve an even more flexible operation of the coextrusion system.

Furthermore, it is possible to arrange the coextrusion heads in parallel, in rows one above the other, or in star-shaped configuration in one or several planes. The number of four extrusion heads as shown in the figures is meant by way of example. A greater or smaller number of coextrusion heads is also possible.

As can further be gathered from FIG. 1, the delivery path provided for the filling material, i.e. for the sausage meat, is constructed by analogy with the delivery path provided for the casing material. In particular, the delivery path provided for the sausage meat comprises a second pump 9 which conveys the sausage meat to the filling material flow divider 7 via a further joint supply means 2, which is of a similar construction as the joint supply means 3 for the casing material. The filling material flow divider 7 may be connected to a distributor such that the individual pumps of the filling material flow divider are arranged in the area of the entry openings of the individual supply elements 5, i.e. the lines leading to the coextrusion heads 1.

In the coextrusion heads 1, the sausage meat and the casing material are co-extruded to obtain sausages which are surrounded with a skin.

Furthermore, the coextrusion system shown in FIG. 1 comprises a control means 10.

Figure 2:
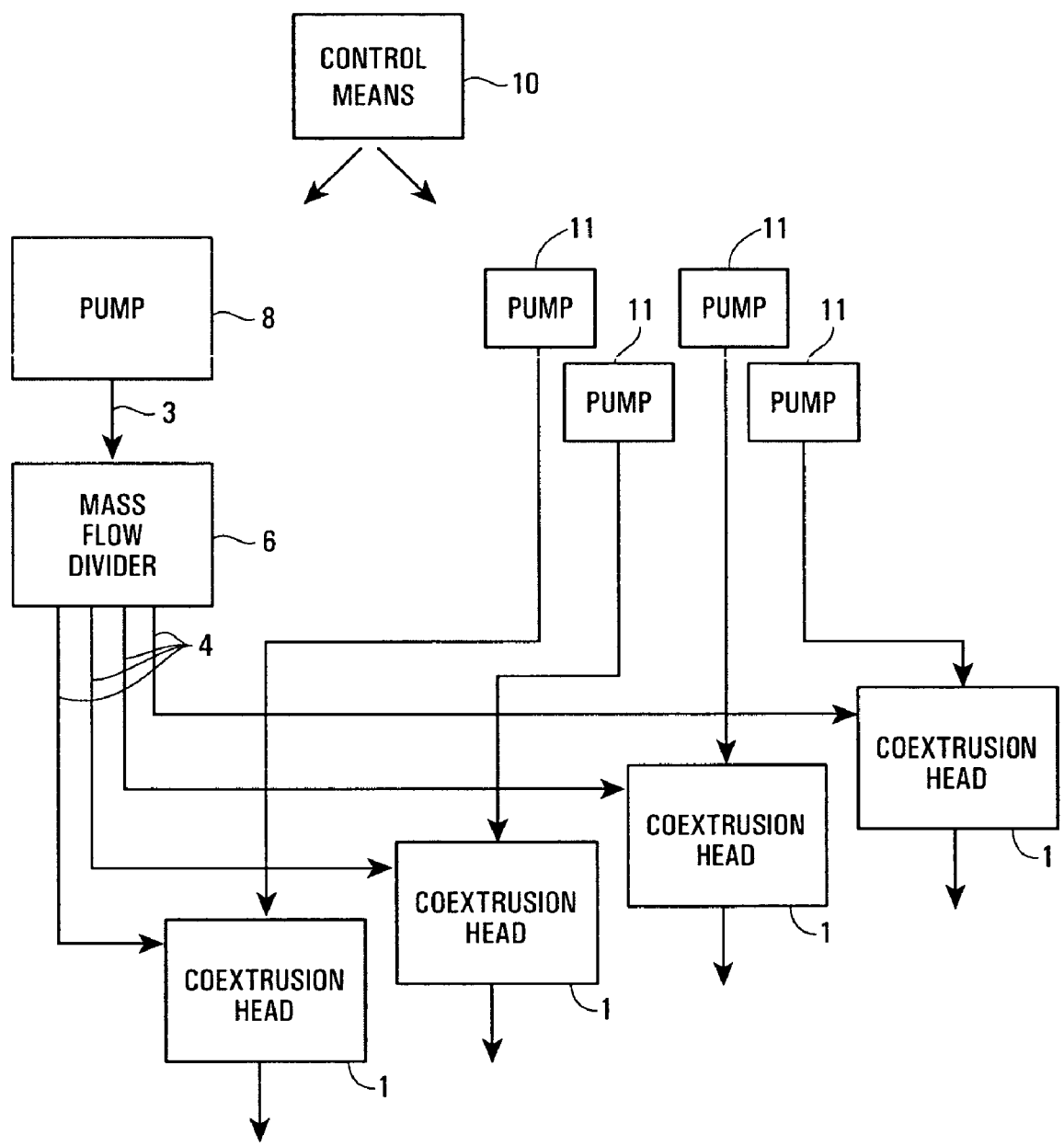
FIG. 2 is a flow diagram showing a construction with flow divider only for the casing material and with separate supplies for the filling material.

The flow diagram illustrated in FIG. 2 for a further coextrusion system shows a delivery path for the casing material which corresponds to the delivery path shown in FIG. 1. Unlike in the case of the coextrusion system shown in FIG. 1, the sausage meat delivery path of the coextrusion system shown in FIG. 2 comprises four pumps 11 that are assigned to the respective coextrusion heads 1.

Figure 3:
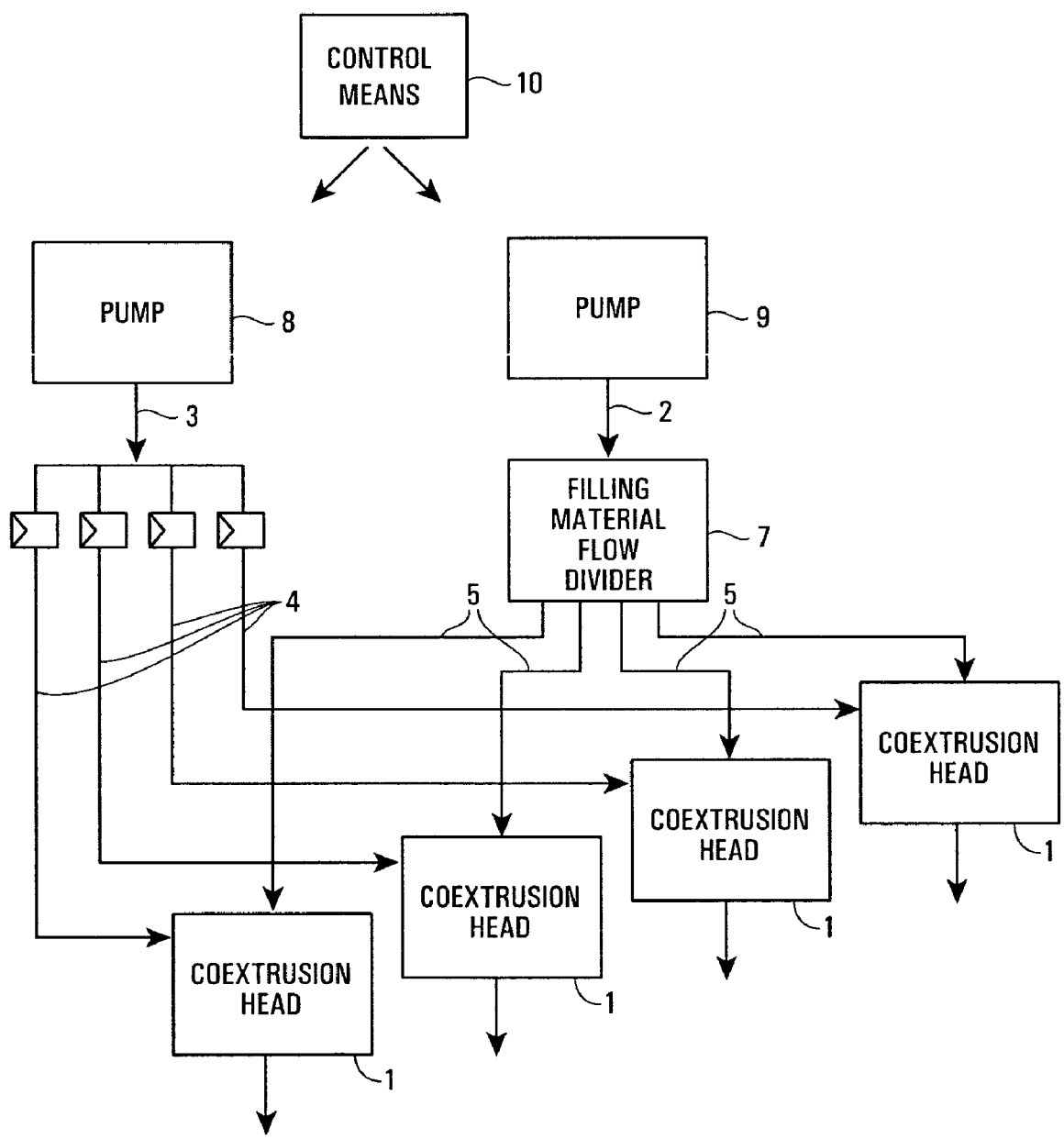
FIG. 3 is a flow diagram showing a construction with regulating units in the individual supply elements for the supply of the casing material and with flow dividers for the supply of the filling material.

The flow diagram illustrated in FIG. 3 shows a coextrusion system having a sausage meat delivery path corresponding to the one in the coextrusion system shown in FIG. 1. The embodiment of FIG. 3 differs from the embodiment shown in FIG. 1 in that the means 6 for regulating/controlling the volume and/or the pressure of the casing material flow are not provided in the joint supply means 3 for the casing material, but in the individual supply elements 4.

We claim:

1. A device for producing sausages having at least two coextrusion heads (1) for co-extruding strands of sausage meat which are encased with a casing material, the device comprising:

at least one of a joint supply means (2) for the sausage meat and a joint supply means (3) for the casing material, each respective joint supply means being connected via individual supply elements (4, 5) to the coextrusion heads (1), and at least one of the joint supply means (3) provided for the casing material and the associated individual supply elements (4) comprises a means (6) for regulating at least one of the volume and the pressure of the casing material flow, wherein the means (6) for regulating at least one of the volume and the pressure are arranged in the joint supply means (3) for the casing material such that the division of the casing material flow into the individual supply elements (4) is carried out by the means (6) for regulating at least one of the volume and the pressure.

2. A device for producing sausages having at least two coextrusion heads (1) for co-extruding strands of sausage meat which are encased with a casing material, the device comprising:

at least one of a joint supply means (2) for the sausage meat and a joint supply means (3) for the casing material, each respective joint supply means being connected via individual supply elements (4, 5) to the coextrusion heads (1), and at least one of the joint supply means (3) provided for the casing material and the associated individual supply elements (4) comprises a means (6) for regulating at least one of the volume and the pressure of the casing material flow, wherein the joint supply means (2) for the sausage meat comprises means (7) for regulating at least one of the volume and the pressure of the sausage meat flow which are arranged such that the division of the sausage meat flow into the individual supply elements (5) is carried out by the means (7) for regulating at least one of the volume and the pressure.

3. A device for producing sausages having at least two coextrusion heads (1) for co-extruding strands of sausage meat which are encased with a casing material, the device comprising:

at least one of a joint supply means (2) for the sausage meat and a joint supply means (3) for the casing material, each respective joint supply means being connected via individual supply elements (4, 5) to the coextrusion heads (1), and at least one of the joint supply means (3) provided for the casing material and the associated individual supply elements (4) comprises a means (6) for regulating at least one of the volume and the pressure of the casing material flow, wherein the means (6) for regulating at least one of the volume and the pressure comprise flow dividers.

4. The device according to claim 3, wherein the flow dividers comprise at least one of gear pumps and vane-type pumps.

5. The device according to claim 4, wherein a plurality of the at least one of gear pumps and vane-type pumps are combined to form a pump block.

6. The device according to claim 5, wherein the flow dividers exhibit different delivery rates per revolution due to at least one of different volumes of the individual pump blocks, separate drives for each pump block, and different gear stages each pump block.

7. A device for producing sausages having at least two coextrusion heads (1) for co-extruding strands of sausage meat which are encased with a casing material, the device comprising:

at least one of a joint supply means (2) for the sausage meat and a joint supply means (3) for the casing material, each respective joint supply means being connected via individual supply elements (4, 5) to the coextrusion heads (1), and at least one of the joint supply means (3) provided for the casing material and the associated individual supply elements (4) comprises a means (6) for regulating at least one of the volume and the pressure of the casing material flow, wherein the joint supply means (3) for the casing material is connected with the individual supply elements (4) such that the casing material flow is divided and the means (6) for regulating at least one of the volume and the pressure of the casing material flow are provided in the individual supply elements (4).

* * * * *